(12) United States Patent
Brotzman, Jr. et al.

(10) Patent No.: US 7,052,777 B2
(45) Date of Patent: May 30, 2006

(54) COMPOSITE NANOPARTICLE MATERIALS AND METHOD OF MAKING THE SAME

(75) Inventors: Richard W. Brotzman, Jr., Naperville, IL (US); Marc L. Kullberg, Lisle, IL (US)

(73) Assignee: Nanophase Technologies Corporation, Romeoville, IL (US)

( * ) Notice: Subject to any disclaimer, the term of this patent is extended or adjusted under 35 U.S.C. 154(b) by 0 days.

(21) Appl. No.: 10/368,941

(22) Filed: Feb. 18, 2003

(65) Prior Publication Data

US 2004/0009349 A1 Jan. 15, 2004

Related U.S. Application Data

(60) Provisional application No. 60/357,567, filed on Feb. 15, 2002.

(51) Int. Cl.
*B01J 23/10* (2006.01)
*B32B 5/16* (2006.01)

(52) U.S. Cl. ............... 428/570; 428/403; 428/404; 75/252; 427/216; 502/302

(58) Field of Classification Search ........ 428/403, 428/404, 570; 75/252, 231, 235; 427/215, 427/216; 502/302, 303, 325, 326
See application file for complete search history.

(56) References Cited

U.S. PATENT DOCUMENTS

| 5,023,139 A | * | 6/1991 | Birnboim et al. ....... 428/402 |
| 5,840,111 A | * | 11/1998 | Wiederhoft et al. ...... 106/436 |
| 6,045,925 A | * | 4/2000 | Klabunde et al. ........ 428/548 |
| 6,228,904 B1 | * | 5/2001 | Yadav et al. ............ 523/210 |
| 6,344,272 B1 | * | 2/2002 | Oldenburg et al. ...... 428/403 |
| 6,372,346 B1 | * | 4/2002 | Toth ..................... 428/403 |
| 6,548,264 B1 | * | 4/2003 | Tan et al. .............. 435/7.21 |
| 6,586,785 B1 | | 7/2003 | Flagan et al. |
| 6,602,479 B1 | * | 8/2003 | Taniguchi et al. ..... 423/239.1 |
| 6,602,932 B1 | | 8/2003 | Feldheim et al. |
| 6,607,829 B1 | | 8/2003 | Bawendi et al. |

OTHER PUBLICATIONS

Rodriguez-Gonzalez, B. et al., "Fully Accessible Gold Nanoparticles within Ordered Macroporous Solids", *Nano Letters*, vol. 2, No. 5, pp. 471-473, Published on Web Mar. 30, 2002.*

Schreder, B. et al., CdTe/CSdS Clusters with "Core-Shell" Structure in Colloids and Films: The Path of Formation and Thermal Breakup, *J. Physical Chemistry B*, vol. 104, pp. 1677-1685, Published on Web Feb. 3, 2000.*

* cited by examiner

*Primary Examiner*—George Wyszomierski
(74) *Attorney, Agent, or Firm*—Wildman, Harrold, Allen & Dixon LLP

(57) ABSTRACT

A composite nanoparticle material comprising a plurality of cores and a plurality of shells. At least one of the cores is encapsulated by one of the shells. An oxygen storage material comprising a plurality of oxygen storage catalyst cores. A plurality of oxygen transport shells. At least one of the oxygen storage catalyst cores is encapsulated by one of the oxygen transport shells.

41 Claims, 5 Drawing Sheets

COMPOSITE NANOPARTICLE MATERIALS AND METHOD OF MAKING THE SAME

CROSS REFERENCE TO RELATED APPLICATION

This application claims the priority of U.S. provisional patent application Ser. No. 60/357,567 filed Feb. 15, 2002.

FIELD

This invention relates to a composite nanoparticle material and, more particularly, to a composite nanoparticle material having a shell-core morphology.

BACKGROUND

Composite materials combine the properties of multiple materials into a single material system. For example, fiber-reinforced plastic composites combine the mechanical strength of fibers with the processability and toughness of a polymer matrix to create a lightweight structural material.

Nanoparticles have unique properties that result from their small particle size, such as high surface area, high reactivity per mass, and discrete particulate morphology. Applications environments, however, are often averse to maintaining the properties associated with the discrete, small particulate nature of nanoparticles.

Therefore, it would be desirable to create a composite nanoparticle system enabling nanoparticle applications in adverse application environments. Such a morphology could be applied to a range of unique applications, including but not limited to catalysts, electro-magnetic materials, chemically passive materials, and economically advantaged materials.

SUMMARY

The shortcomings of the existing art are overcome and additional advantages are provided through the provision of a composite nanoparticle having a shell-core morphology and a method for making the same.

In one example, the present invention relates to a composite nanomaterial having a shell-core morphology. The composite material includes a plurality of substantially spherical nanocrystalline cores. Each core comprises at least one metal or metal oxide. A shell encapsulates each core. Each shell in one example comprises at least one metal oxide and optionally at least one metal or additional metal oxide.

In another example, the invention relates to a composite nanomaterial having a shell-core morphology. The material includes a plurality of substantially spherical nanocrystalline particles. Each particle in one example comprises at least one metal or metal oxide. Each particle is encapsulated within a shell. The shell in one example comprises at least one metal oxide. In another example the shell comprises at least one metal oxide and at least one metal or at least one additional metal oxide.

In a further example, the invention relates to a composite nanomaterial comprising a nanoparticle having a defined BET specific surface area. The nanoparticle comprises a substantially spherical nanocrystalline particle of at least one metal or metal oxide. A shell encapsulates each particle. The shell in one example comprises at least one metal oxide. For example, the shell could comprise one metal oxide and at least one metal or one additional metal oxide. The weight of the core and the weight of the shell in one example have a ratio of from about 60:40 to about 98:2.

In another example, the invention is directed to a method of preparing a composite nanomaterial having a shell-core morphology. The method comprises mixing a powder comprising substantially spherical nanocrystalline particles with a coating precursor. The mixture is carried out at a temperature, in an environment, and for a time that is effective for the coating precursor to wet the particles and form the shell thereon.

DETAILED DESCRIPTION

Following are definitions of terms that are used throughout the description:

BET specific surface area—the surface area determined by the Brunauer, Emmett, and Teller method for determining specific surface area by nitrogen adsorption. The theory is described in Adamson, Arthur W., "Physical Chemistry of Surfaces," ch. 13 entitled "Adsorption of Gases and Vapors on Solids," pp. 584–589, published by Interscience Publishers (1967), which is hereby incorporated by reference. Unless stated otherwise, all references to the surface area of the catalyst, core, particles or cerium oxide refer to the BET surface area.

Catalytic process temperature—a temperature typifying a catalytic process and other processes that involve catalysts.

Oxide—a mineral compound in which metallic atoms are bonded to oxygen atoms, irrespective of the number of oxygen atoms present.

Shell-core morphology—the structure of the composite nanomaterial, as it comprises a core of one material encapsulated within a shell of another material.

Thermogravimetric analysis ("TGA")—measures the change in weight of a sample as a function of temperature and/or time.

In accordance with the principles of the present invention, a composite nanomaterial and a method for making the same are provided. Detailed discussions of several examples of the invention are now presented herein for illustrative purposes.

Figure 1:
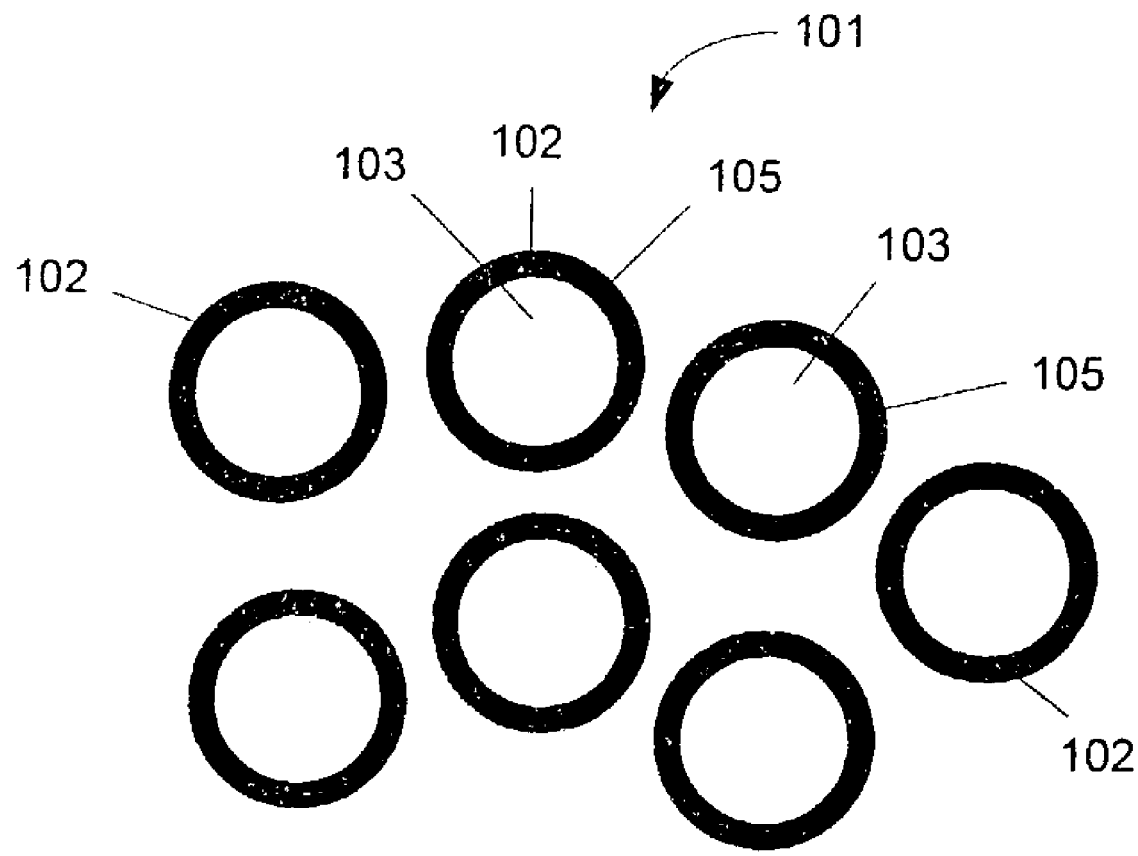
FIG. 1 is an exemplary depiction of a composite nanomaterial including a discrete shell encapsulate in accordance with one example of the invention.

Referring to FIG. 1, in one example the composite nanomaterial comprises a discrete shell-core encapsulate 101. The shell-core encapsulate 101 in one example comprises a plurality of nanoparticles 102. Each nanoparticle 102 comprises a substantially spherically nanocrystalline core 103. Core 103 can have multiple shapes, such as substantially spherical or equi-axed. The mean diameter of core 103 can vary. Examples include from about 1 nm to about 900 nm, from about 2 nm to about 100 nm, from about 5 nm to about 40 nm. Cores 103 typically constitute from about 60 to about 98 percent, by weight, of the discrete shell-core encapsulate 101.

The composition of each core 103 in one example includes at least one metal or metal oxide. Other constituents may be present in core 103 in nominal amounts. Examples of these include, but are not limited to, surfactants, salts, residual solvents and processing aids, such as dispersants.

Each core 103 is encapsulated by a shell 105. The composition of shell 105 in one example comprises a metal oxide, either alone or in combination with a metal or another metal oxide. Shell 105 may be applied to be as thick as desired for conferring an improvement in application properties. For example, 4-wt % of a metal alkoxide or metal benzylate precursor encapsulating approximately 85% of the nanoparticle surface area of a nanoparticle with a BET of 20 $m^2/g$ can render the core compatible with an application environment, such as high temperature or extreme pH.

Shell 105 comprises one layer or multiple layers. For example, if shell 105 comprises two layers, each layer either could have the same composition, or one layer could have a first composition, and the other layer could have a second composition. The composition of the layer (or layers) is selected to impart particular properties to the nanomaterial. For example, a zirconium oxide shell imparts a thermally stable oxygen storage capacity to a cerium oxide core and a silicon oxide shell imparts pH-stability to a zinc oxide core.

In a multi-layered shell, each layer may have the same thickness or, alternatively, a different thickness. Each individual layer may be applied as thick as desired for conferring an application function. Shell layer thickness and texture may differ because of shell precursor reactivity, shell precursor molecular size, or application need. The layers may be deposited so that the interface between the layers is smooth. Alternatively, the interface between the layers may be textured, with peaks, ridges, and/or undulations. For instance one layer may have peaks while the other layer has depressions; the peaks from the one layer are imbedded within the other layer. Having a textured interface increases the BET surface area of the core.

For example, titanium dioxide, in an anatase crystalline form, may need to be rendered UV-stable and chemically compatible with an organic matrix. For this application environment an inner shell of aluminum oxide is applied at approximately 10% nanoparticle surface coverage to enable UV-stability (by forming electron-hole recombination sites) and a subsequent functionalized silicon oxide coating is applied at 80% to 100% nanoparticle surface coverage to provide chemical compatibility with the polymer matrix. The interface in this example is textured because the inner shell layer is not complete. But some applications may require complete inner shells and a smooth inter-shell interface.

A description of one example of a preparation method for the composite nanomaterial is now provided for illustrative purposes.

In one example, the method comprises introducing a powder comprising a plurality of nanoparticles into a coating vessel that is capable of mixing and heating its contents under a controlled environment. One example of a suitable device is a Buchi Rotovap, available from Brinkmann Instruments, located in Des Plains, Ill.

The powder is mixed with a coating precursor and heated in an environment to a predetermined temperature and for a time effective for the coating precursor to wet the particles and form a shell thereon. Examples of coating precursors include, but are not limited to, metal alkoxides and metal benzylates. Volatile by-products, such as alcohols, may be driven off as the coated powder is heated. The nanopowder and the coating precursor are added in quantities effective to enable a specific application—low degree of coverage for UV-stability to complete, or near complete, coverage for chemical compatibility—thus forming the shell-core structure. The amount of coating precursor used is directly related to the particle surface area or the particle size. Particle size is measured by nitrogen adsorption using the "BET" technique. For example, 4-wt % of a metal alkoxide or metal benzylate precursor encapsulates approximately 85% of the nanoparticle surface area for a nanoparticle with a BET of 20 $m^2/g$. If the nanoparticle has a BET of 40 $m^2/g$, twice the precursor would be required to encapsulate and equivalent amount of the nanoparticle surface area.

The composite nanomaterial described above can be used for a variety of applications. Several example applications, for which the composite nanomaterial can be employed, are now described for illustrative purposes.

EXAMPLE 1

An Oxygen Storage Catalyst

The following terms are used in this example and have the meanings set forth below unless it is stated otherwise:

Oxygen storage capacity (OSC)—the ability of the oxygen storage material to absorb oxygen in an oxidative atmosphere and desorb oxygen in a substantially inert atmosphere. In this invention, the OSC was quantified on a Hi-Res TGA 2950 Thermogravimetric Analyzer, available from TA Instruments, New Castle, Del., which measures the weight of the oxygen storage material as a function of temperature after the oxygen storage material is subjected to sequential oxidation-reduction cycles. Each oxidation-reduction cycle involves (a) heating the test material to 600° C. under oxygen at 10° C. per minute to fully oxidize the material, (b) reducing the material with a hydrogen-nitrogen gas (2%/98%, mole basis) for 15 to 45 minutes at 600° C., and (c) oxidizing the material with oxygen for 10 to 30 minutes at 600° C. The OSC of the material, expressed as moles of oxygen per gram of catalyst, is then calculated as follows: OSC=[mass under oxygen−mass under hydrogen-nitrogen]/[32×mass of oxygen storage material]

Oxygen transport material—a material through which oxygen may be transmitted by any mechanism.

Sintering—the agglomeration of particles when heated at temperatures below their melting point. Agglomeration implies the formation of a particle cluster. As used herein, the term sintering can also be referred to as reacting.

Figure 2:
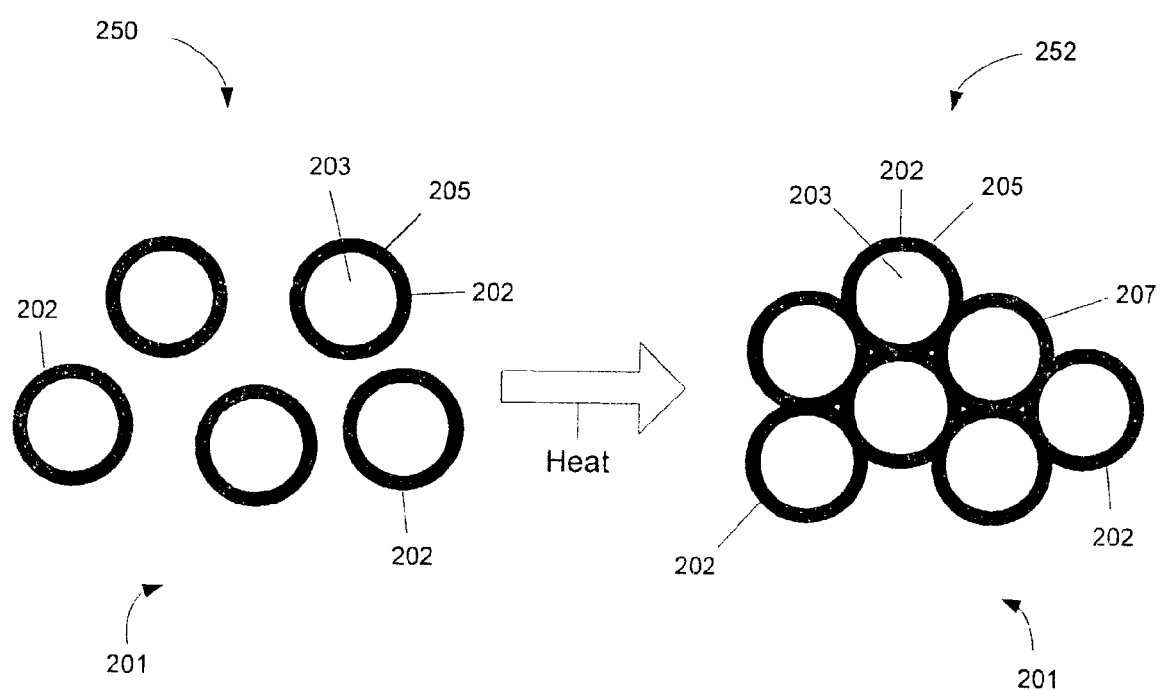
FIG. 2 is an exemplary depiction of two states of a composite nanomaterial implemented as an oxygen storage catalyst in accordance with another example of the invention.

Referring to FIG. 2, in accordance with one example of the present invention, a composite nanomaterial comprises a composite oxygen storage catalyst 201. In one example, catalyst 201 includes a plurality of particles 202. Each particle 202 comprises a core 203 made of an oxygen storage material. Each core 203 can have a variety of shapes, such as substantially spherical, or equiaxed.

Each core 203 is encapsulated by a shell 205 made of an oxygen transport material. The shell acts to prevent the catalyst cores 203 from sintering together. The separation of cores 203 optimizes the oxygen storage capacity of the catalyst at typical catalytic process temperatures by preventing a decrease in the active surface area of the oxygen storage catalyst (the cores). Oxygen transport through shell 250 depends on the chemical properties of the shell and the shell thickness.

In one example, each core 203 includes at least one metal oxide where the metal is selected from the lanthanides (atomic numbers 58–71), scandium, yttrium, and lanthanum. In another example, each core 203 comprises lanthanum oxides. In a further example core 203 comprises oxides and mixed oxides of cerium. In yet another example, each core 203 may comprise a combination of oxides or mixture of oxides (e.g., 10% may comprise an oxide of yttrium, 20% may comprise an oxide of lanthanum, 30% may comprise an oxide of scandium, and 40% may comprise an oxide of cerium). Other constituents may be present in each core 203 in nominal amounts. Examples include surfactants, salts, residual solvents and processing aids such as dispersants and plasticizers.

Shell 205 in one example comprises an oxide. In another example shell 205 comprises an oxide in combination with at least one metal or another metal oxide. In a further example, shell 205 comprises an oxide and a catalytic metal. In yet another example, more than one component, including zirconium oxide, is used in shell 205. Examples include, but are not limited to, zirconium oxide, platinum oxide-zirconium oxide, platinum-zirconium oxide. The percentage of zirconium oxide in the oxygen storage catalyst can vary. Example ranges of zirconium oxide in the oxygen storage catalyst shell 205 include but are not limited to about 51 to about 100%, by total weight of shell 205, about 75 to about 100%, by total weight of shell 205, about 90 to about 100%, by total weight of the shell 205. Shell 205 may be applied to be as thick as desired for conferring an improvement in oxygen transport and oxygen storage capacity. For example, 8-wt % of a zirconium alkoxide or zirconium benzylate processor encapsulates approximately 85% of the surface area for cerium oxide nanoparticles with a BET of 40 $m^2/g$. The resulting zirconium oxide shell is approximately 4-wt % of the shell-core composite particle (the weight difference between shell precursor and shell results from volatile reaction by-products of the shell precursor).

Shell 205 can comprise one layer or multiple layers of oxygen transport material. For example, if shell 205 comprises two layers, each layer could have the same composition. In another example, one layer could have a first composition, such as zirconium oxide, and the other layer could have a second composition, such as zirconium oxide and platinum. The composition of the layer (or layers) is selected to impart particular properties to the nanomaterial. Shells comprised of zirconium transport oxygen to and from the oxygen storage catalyst cores. The addition of platinum to the shell imparts additional catalytic function to the particles.

In a multi-layered shell, the layers of oxygen transport material may have a substantially uniform thickness or the layers may each have a different thickness. The individual layers may be applied as thick as desired for conferring an improvement in oxygen transport and oxygen storage capacity at application conditions. As a rule of thumb, 16-wt % shell precursor is required to encapsulate 85% of the available core surface area for cores with a BET of 80 $m^2/g$. The layers may be deposited so that the interface between the layers is smooth. Alternatively, the interface between the layers may be textured, with peaks, ridges, and/or undulations. For instance, one layer may have peaks while the other layer has depressions; the peaks from the one layer are imbedded within the other layer. Having a textured interface increases the BET surface area of the core. Textured shells may increase oxygen transport in certain applications.

In one example, in the oxygen storage material, core 203 and shell 205 are present in a ratio ranging from about 60:40 to about 98:2 for core 203 and shell 205, by weight. Other exemplary ranges include, but are not limited to, from about 75:30 to about 98:2, and from about 90:10 to about 98:2, by weight.

The BET specific surface area of the oxygen storage catalyst 201 was measured before and after being subjected to sequential cycles of oxidation and reduction, as described above in the definition of "oxygen storage capacity," and quantifies particle size. The oxygen storage catalyst generally retained a relative OSC of about 1, with respect to unheated, uncoated, oxygen storage material at catalytic process temperatures, despite any reduction in the BET surface area.

FIG. 2 schematically illustrates two states 250, 252 of catalyst 201 in accordance with the present invention. State 250 depicts the unsintered nature of individual coated catalyst cores 203 after heating to a temperature of about 600° C. State 252 shows that after heating to a temperature typical of catalytic processes, such as about 1050° C., shells 205 surrounding adjacent catalyst cores 203 sinter together to form a reticulated network 207. The individual catalyst cores 203 are embedded in the network 207 of the shell material, which prevents cores 203 from sintering together. The composite catalyst particles thus possess a reduced specific surface area and a higher OSC, relative to uncoated catalysts, after heating to elevated temperatures.

Reticulated network 207 is formed when the composite shell-core morphology is heated above the sintering temperature of the shell material. The sintering temperature will vary depending on the shell material but thermal excursions above this temperature will always generate reticulated network 207 where the continuous phase of network 207 will be the shell material and the discontinuous phase will be the core material. In the oxygen storage catalyst 201, reticulated network 207 quenches possible sintering of the core catalyst and prevents degradation in catalyst activity that would otherwise be attributed to a decrease in active surface area of catalyst nanoparticle at temperatures above the sintering temperature. Catalytic function is retained in this example because the shell material is also an oxygen transport material and enables rapid transport of oxygen across the shell, or continuous phase of the reticulated network.

The formation of reticulated network 207 is a general consequence of the shell-core composites and may be employed to enable a range of applications.

In another example, the composite nanomaterial comprises an oxygen storage material. The oxygen storage material includes a plurality of oxygen storage catalyst particles and an oxygen transport material. Each particle is encapsulated within the oxygen transport material as a result of mixing a powder comprising the oxygen storage catalyst particles with a coating precursor at temperature, environment, and for a time effective for the coating precursor to wet the particles and form an oxygen transport shell thereon. The oxygen storage material so formed has a shell and a core, wherein each particle is a core. The cores/particles, the shell, and the oxygen storage materials are as described above and have the properties as described above.

In another example, the composite nanomaterial comprises an oxygen storage material having a defined BET specific surface area. The oxygen storage material comprises a plurality of oxygen storage catalyst cores and an oxygen transport shell encapsulating each of the cores. When the oxygen storage material is heated to at least a catalytic process temperature, the shell prevents the cores from sintering together, so that the oxygen storage material retains a relative oxygen storage capacity of about one, with respect to the unheated, uncoated oxygen storage material, despite any reduction in the BET surface area.

An exemplary method of preparing oxygen storage catalyst 201 is now described for illustrative purposes. In one example, the method comprises introducing a powder containing a plurality of oxygen storage catalyst particles into a coating vessel that is capable of mixing and heating its contents under a controlled environment. One example of a suitable device is a Buchi Rotovap, available from Brinkmann Instruments, located in Des Plains, Ill. Examples of suitable coating precursors include but are not limited to zirconium alkoxides and benzylates such as zirconium 1-butoxide, $Zr[O(CH_2)_3CH_3]_4$; zirconium benzylate, $Zr[OCH_2C_6H_5]_4$; zirconium isopropoxide, $Zr[OCH(CH_3)_2]_4$, and combinations thereof. The coating precursors react with water to form a metal oxide by condensation reactions with the respective ligated alcohol byproduct.

Heating can be conducted within various temperature ranges. Examples include but are not limited to from about 60° C. to about 160° C., from about 70° C. to about 120° C., and from about 80° C. to about 95° C. A water or oil bath is typically employed as a means of maintaining a uniform temperature. The heating step is conducted for a time sufficient for wetting the powder, reacting the coating precursor, and possibly removing process solvents and/or reaction byproducts. The rate of heating is process scale dependent. The environment used should be substantially inert; it may comprise predominately nitrogen or any other inert gases such as argon, or combinations thereof. After formation, the oxygen storage material may be stored at room temperature and conditions. Or the oxygen storage material may be further heated to remove remaining organics in the shell.

As an alternative, prior to the step of mixing the powder with the coating precursor, the powder may be heated, with mixing, to a temperature that facilitates facile wetting of the powder surface by the coating precursor. After the powder has attained the desired temperature, the precursor coating is then introduced, and the two components are heated and mixed as described above. One having ordinary skill in the art would be able to determine a suitable mixing speed, heating rates, reaction temperatures and times.

As yet another alternative, the method may include a cooling step, wherein the oxygen storage material is cooled to ambient temperature prior to being removed from the coating vessel. The cooling step is also process scale dependent.

Following are detailed examples that illustrate and explain one example of a method for making an oxygen storage material that includes cerium oxide. These examples should not be taken as limiting the composite nanomaterial of the present invention to an oxygen storage material in any way. Moreover, these examples should not be taken as limiting an oxygen storage implementation of the present invention to one that includes cerium oxide. Despite the examples employing cerium as the catalyst, the method is equally applicable to other suitable catalysts described herein.

Cerium oxide is an oxygen storage material and is used as a co-catalyst for purifying automobile exhaust gases. Cerium oxide absorbs oxygen under an oxidizing atmosphere and desorbs oxygen under a reducing atmosphere and is a component of a three-way catalyst to improve the efficiency of catalytic converters in purifying automotive exhaust gases containing hydrocarbons (HC)/carbon monoxide (CO)/nitrogen oxides ($NO_x$). During the oxygen poor cycle of an engine, cerium oxide provides oxygen required to oxidize CO and HC to $CO_2$ and $H_2O$. During the oxygen rich cycle of an engine, cerium oxide absorbs oxygen to be used in the oxygen poor cycle.

The oxygen-absorbing and -desorbing property of cerium oxide is thermally sensitive. At temperatures above 600° C. cerium oxide particles sinter together causing a decrease in the cerium oxide particle surface area and degrading the ability of cerium oxide to act as an oxygen storage material. The degree to which cerium oxide particles sinter together increases with temperature and limits the application temperature of particulate oxygen storage catalysts. This is particularly true as the particle size of the oxygen-storage material is decrease to below 40-nm.

It would provide substantial economic benefit to have a nanosized, particulate oxygen storage catalyst which does not exhibit particle size reduction, or a reduction in active catalyst surface area, and the concomitant degradation of the oxygen storage capacity at elevated temperatures. Activity would be maximized by the active surface area of the nanosized particles and application efficiency would be increased at higher application temperatures.

EXAMPLE 1.1

A series of oxygen storage materials having a cerium oxide catalyst core was prepared with three types of coating precursors at different concentrations to form a zirconium oxide shell. The precursors included zirconium butoxide, zirconium propoxide, and zirconium benzylate, zirconium compounds obtained from Sigma-Aldrich, Milwaukee, Wis., or Advanced Materials, New Hill, N.C. Both precursors react to form zirconium oxide by condensation reactions with the respective ligated alcohol byproduct. Table 1 identifies the coating precursors and the concentrations used.

The oxygen storage catalyst core, cerium oxide with BET=90 $m^2$/g, is a substantially spherical nanocrystalline powder obtained from Nanophase Technologies Corporation, Romeoville, Ill.

30 grams of cerium oxide powder was added to a vessel of a rotary evaporator. The vessel was partially submerged in a water bath at 60° C. and rotated at 20 rpm for 15 minutes under a nitrogen atmosphere until the cerium oxide powder is 60° C. The rotation was stopped to allow the coating precursor solution to be added to the vessel. Rotation was resumed at 20 rpm, and the powder and coating precursor were heated under nitrogen to 95° C. for 2 hours. A vacuum was pulled for 30 minutes with a small nitrogen flow to remove process solvents and by-products.

The OSC of the coated cerium oxide, and uncoated cerium oxide, was quantified by thermogravimetric analysis on a Hi-Res TGA 2950 Thermogravimetric Analyzer, available from TA Instruments, New Castle, Del. The analyzer measured the weight of the sample as a function of temperature; independent variables included the temperature cycle, the sample size, and the atmosphere for analysis. The coated cerium oxide was subjected to oxidation-reduction as follows: (a) the coated cerium oxide was heated to 600° C. under oxygen [10° C./minute] to fully oxidize the cerium oxide, (b) the cerium oxide was then reduced with hydrogen and nitrogen gas in a weight ratio of 2:98 for 15–45 minutes at 600° C., and (c) the cerium oxide was next oxidized with oxygen for 10–30 minutes at 600° C. The oxidation-reduction cycle was repeated up to three times.

Figure 3:
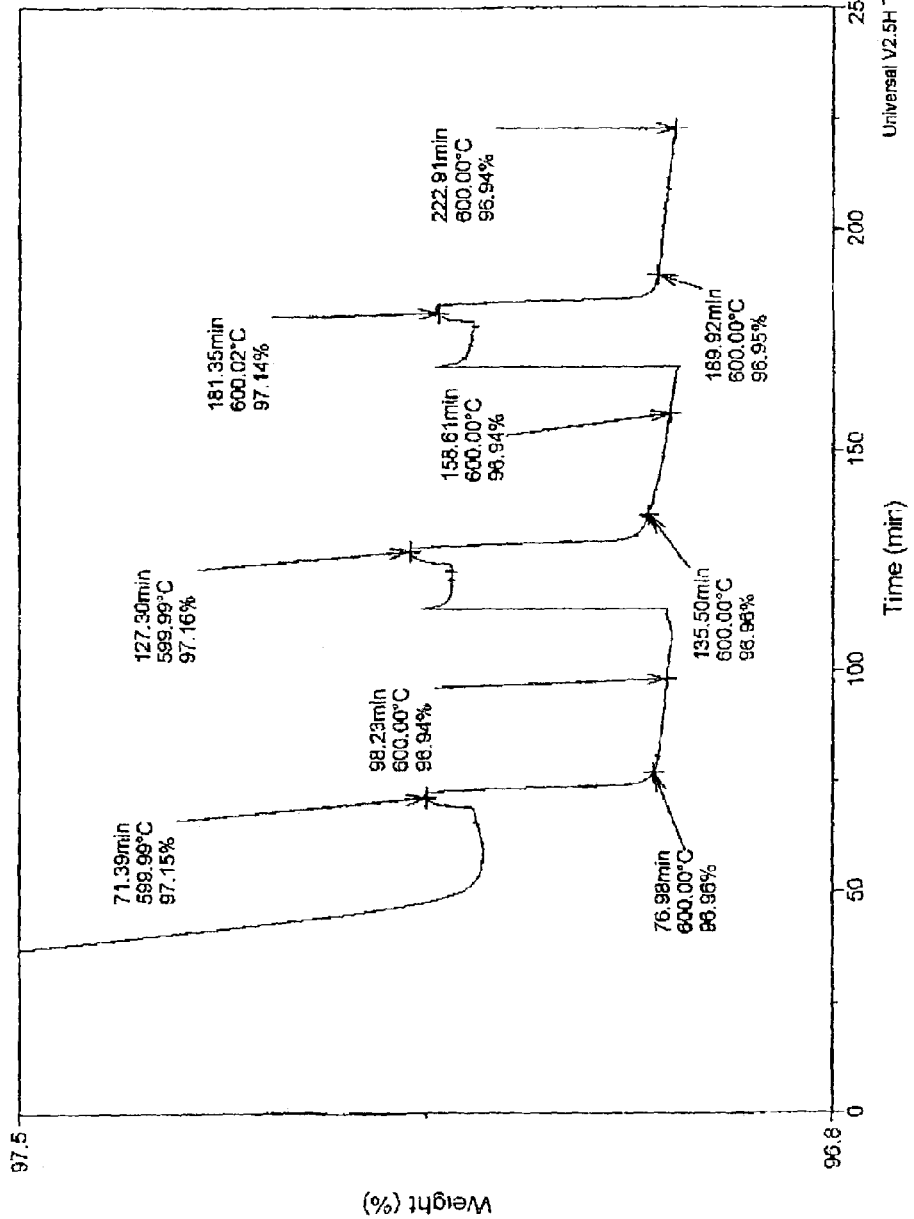
FIGS. 3–5 are thermogravimetric analyses of oxygen storage materials employable in the composite nanomaterial of FIG. 2.
Figure 4:
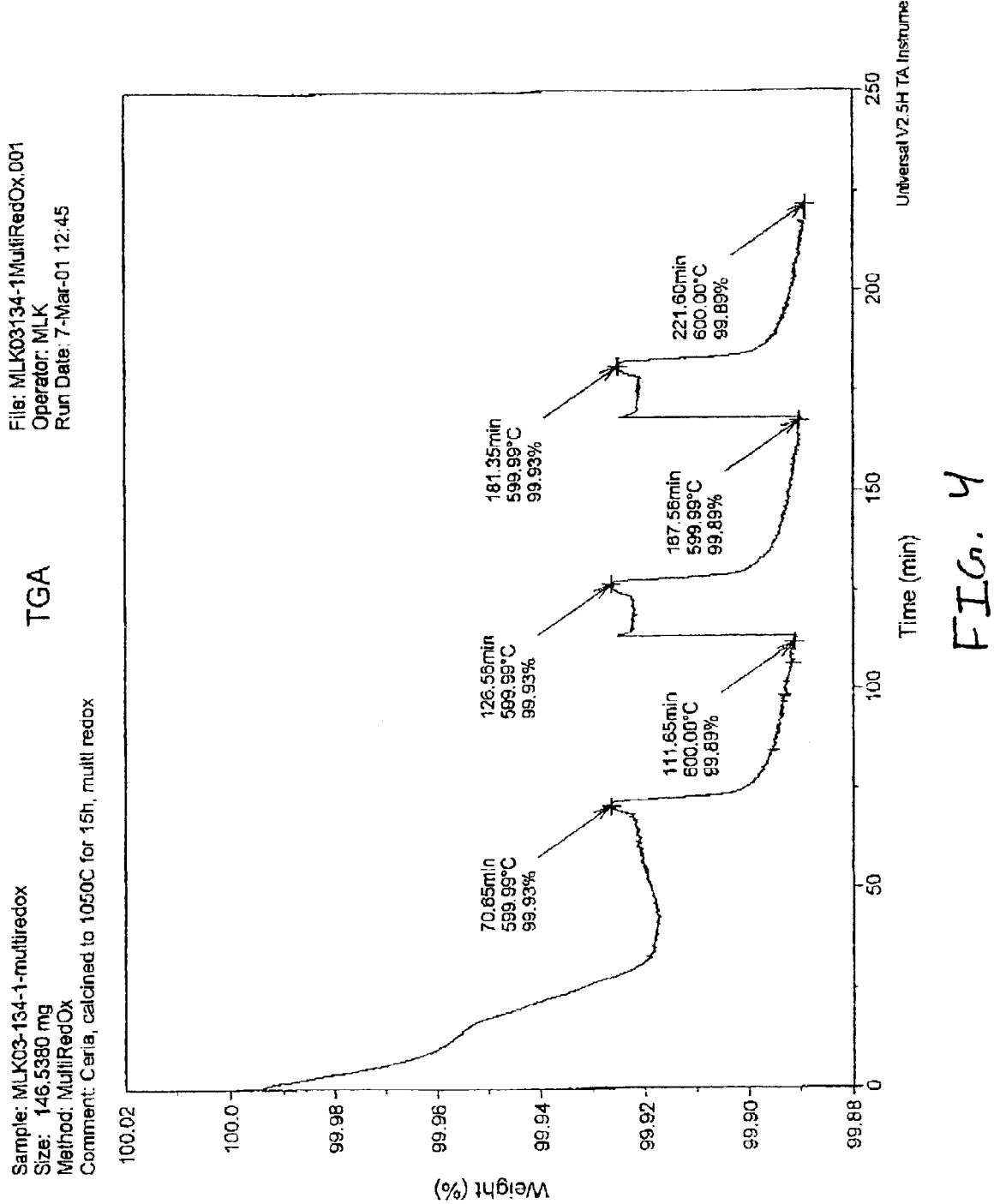
Figure 5:
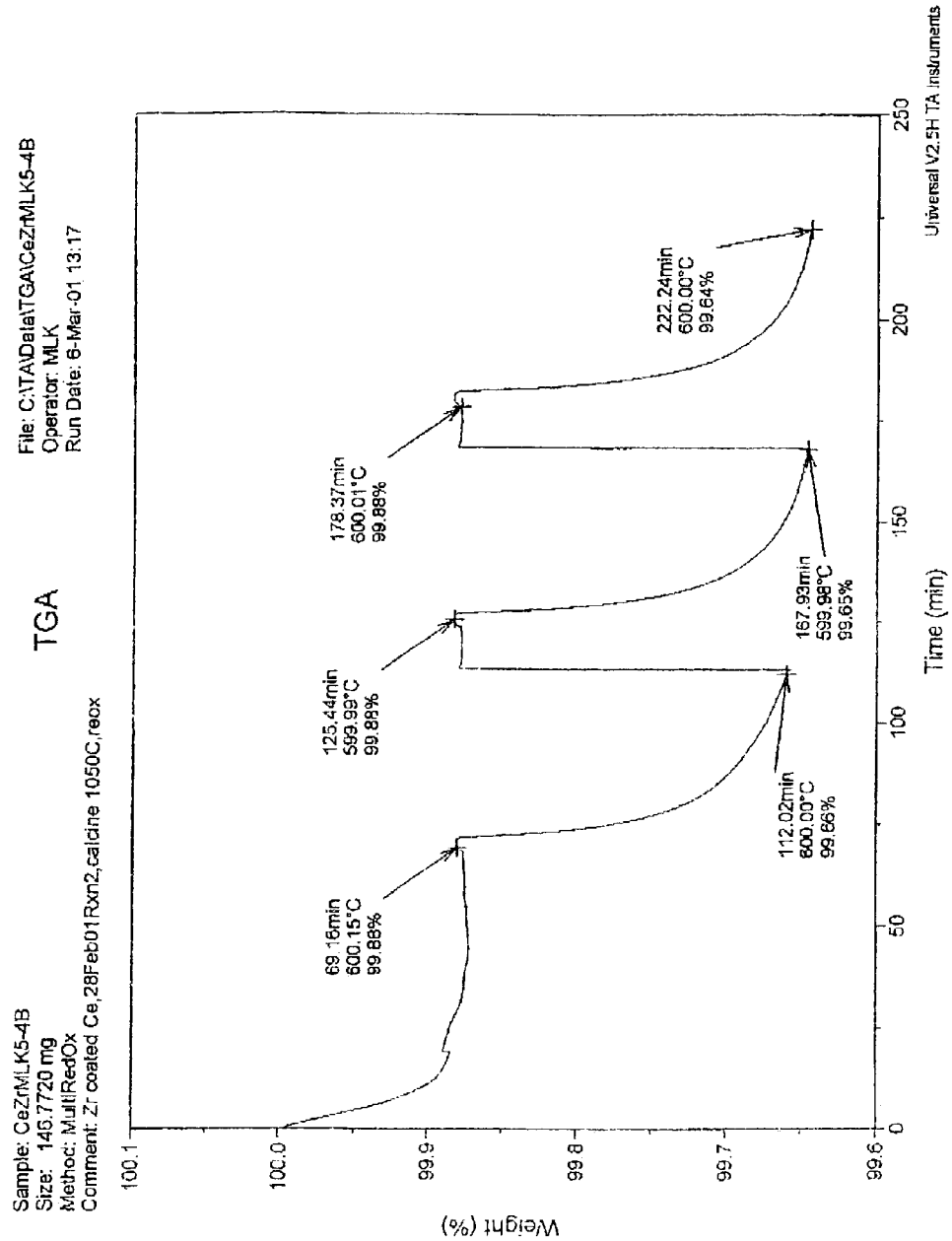

FIGS. 3–5 are thermogravimetric analyses (TGA) of selected oxygen storage materials in Table 1. FIGS. 2–4 are multi-redox TGAs of uncoated, uncalcined cerium oxide (BET=90-$m^2$/g, OSC=72 μmoles $O_2$/g); uncoated, calcined at 1050° C. cerium oxide (BET=5-$m^2$/g, OSC'12.5 μmoles $O_2$/g); and zirconium oxide coated, calcined at 1050° C. cerium oxide (BET=0.99-$m^2$/g, OSC=78–81 μmoles $O_2$/g); respectively.

Table 1 reports the BET specific surface area and the OSC for the oxygen storage materials and uncoated cerium oxide.

TABLE 1

Composition of oxygen storage materials and their BET specific surface area and OSC

| Oxygen Storage Material | Coating precursor | % Coating precursor | Calcination Temp, ° C. | BET SSA (m²/g) | Catalyst OSC (μmoles O₂/g) |
|---|---|---|---|---|---|
| Uncoated Cerium Oxide | None | — | Uncalcined | 90 | 72 |
| | None | — | 600 | 76 | 77 |
| | None | — | 850 | 27 | 59 |
| | None | — | 1050 | 5 | 12.5 |
| A | Zirconium 1-butoxide | 12.20 | Uncalcined | | 69 |
| | | | 1050 | 1.5 | 25 |
| B | Zirconium benzylate | 22.72 | Uncalcined | | 53 |
| | | | 1050 | 5.0 | 50 |
| C | Zirconium 1-butoxide | 17.83 | Uncalcined | | 59 |
| | | | 1050 | 2.7 | 38 |
| D | Zirconium benzylate, 80 wt % in 1-BuOH | 22.72 | Uncalcined | | 56 |
| | | | 1050 | 0.99 | 81, 78 |
| E | Zirconium propoxide, 55 wt % in iPA | 22.61 | Uncalcined | | 153 |
| | | | 1050 | | 125 |
| F | Zirconium butoxide, 60 wt % in iPA | 25.49 | Uncalcined | | 158 |
| | | | 1050 | | 133 |
| G | Zirconium benzylate, 75 wt % in iPA | 31.65 | Uncalcined | | 133 |
| | | | 1050 | | 123 |

The results show uncoated cerium oxide exhibits decreases in OSC when subjected to increasing calcination temperatures. A higher concentration of coating precursor is associated with an increase in the OSC (compare material A, C, and F with uncoated calcined cerium oxide). The coating properties of the zirconium precursors, evidenced by a higher OSC, were substantially improved with the precursor was diluted with an alcohol to improve its ability to wet the cerium oxide powder (compare material B, D, and G with other coated, calcined cerium oxide).

EXAMPLE 1.2

The effect of calcination temperature on OSC was studied on oxygen storage material having a cerium oxide core and zirconium oxide shell. Oxygen storage materials were prepared in accordance with the method described in Example 1, using 9.26 grams zirconium benzylate (80 wt % in 1-butanol) as the coaring precursor. The OSC and BET specific surface area were measured and compared against that of uncoated cerium oxide. Results are shown in Table 2.

TABLE 2

BET SSA and OSC of oxygen storage material having a ceria core and a zirconium dioxide shell.

| Catalyst core/shell | Calcination Temperature, ° C. | BET SSA (m²/g) | Catalyst OSC (μmoles O₂/g) |
|---|---|---|---|
| Uncoated Cerium Oxide | Uncalcined | 90 | 72 |
| | 600 | 76 | 77 |
| | 850 | 27 | 59 |
| | 1050 | 5 | 12.5 |
| Cerium oxide core/ zirconium oxide shell (D in Table 1) | Uncalcined | | 56 |
| | 600 | 67 | 119, 114 |
| | 1050 | 0.99 | 81, 78 |

Volatile coating components were removed from the inventive oxygen storage material at 600° C., but sintering did not occur. At 1050° C., the oxygen storage material had sintered, as indicated by the drop in BET specific surface area to 0.99, but the OSC remained higher than that of uncalcined cerium oxide. The decrease in OSC from 600° C. to 1050° C. suggests that zirconium oxide enables isolated cerium oxide particles to store and release oxygen even after the zirconium oxide—cerium oxide composite has sintered.

EXAMPLE 1.3

The materials in Example 1 where the core-shell morphology is converted to cores surrounded by a reticulated morphology that also allows oxygen transport to encapsulated oxygen storage cores.

EXAMPLE 2

Electro-Magnetic Materials

Another example of an implementation of the composite nanomaterial of the present invention is as an electromagnetic material. Nanoparticles are important optical materials because their small size renders them transparent in the visible region of light yet they may interact strongly with the ultraviolet (UV) or infrared (IR) radiation. Composite core-shell nanoparticles are unique because specific properties of a nanoparticle core, such as refractive index or scattering cross section, are tailored by the addition of a shell to meet specific application requirements. Specific examples of uses of the composite nanomaterial in an electromagnetic implementation include, but are not limited to:

Zinc oxide absorbs UV-a radiation. Titanium oxide absorbs UV-b radiation. Zinc oxide cores and titanium oxide shells, or titanium oxide cores and zinc oxide shell, are unique composite nanoparticles that uniformly absorb UV-a and UV-b radiation and impart broad UV protection to a coating.

The refractive index of an aluminum oxide nanoparticle (refractive index=1.7) may be tailored by coating it with a shell composed of silicon oxide (refractive index=1.4), or zinc oxide (refractive index=2.0), or cerium oxide (refractive index=2.0), or titanium oxide (refractive index=2.2), or mixtures thereof, etc., to create a unique refractive index materials. The composite nanoparticles are added to coatings and devices to control the transport of radiation through the material. For example, composite shell-core nanoparticles fabricated to match the refractive index of a coating material will be transparent and render the coating wear and scratch resistant. Composite shell-core nanoparticles with tailored, refractive index may be incorporated into a lens to enable radiation to be focused or defocused.

Lightweight, low loss, high energy storage materials are required for pulse power applications ranging from capacitors to pulse-forming lines. To maximize the dielectric energy density a material must maximize dielectric constant and the ability to withstand operational electric field (energy density varies as the square of the electric field and in direct proportion to the dielectric constant). Composite core-shell nanoparticles with tailored dielectric constant and interfaces may be incorporated into high-dielectric strength polymers for high energy storage materials. High dielectric constant nanoparticle cores (barium titanium oxide) with controlled dielectric shells (zirconium oxide, or barium calcium strontium oxide) enable high dielectric constant composites with a high breakdown strength to be fabricated.

The rheology of fluids may be controlled by subjecting fluids filled with an electro-active material to electromagnetic radiation. The fillers in a fluid will respond to the applied radiation and the fluid viscosity will change. Composite core-shell nanoparticles incorporated into fluids enable large, rapid responses to radiation of a specific frequency.

EXAMPLE 3

Chemically Passive Materials

Another example of an implementation of the composite nanomaterial is as a chemically passive material. Every application has a unique chemical environment and in some instances the interfacial region surrounding a nanoparticle must be rendered chemically passive. Composite core-shell nanoparticles can enable these applications.

Specific examples include, but are not limited to:

Many personal care applications require UV protection, or anti-microbial protection, etc. with transparency in application. Nanoparticle zinc oxide enables these properties but is often chemically incompatible with the formulation or delivery device. Composite shell-core nanoparticles where the core is zinc oxide and the shell is comprised of a stable material such as silica in the application environment enable these applications.

Many structural materials have limited thermal application because they suffer diminished physical properties under thermal stress. Often a solution is the incorporation of a second phase into the material to form a structural composite. But the interface between the two composite components must be rendered chemically passive to prevent undesirable reaction between composite components. Composite core-shell nanoparticles where the core is aluminum oxide and the shell is comprised of a thermally stable material such as yttrium stabilized zirconium oxide enable high temperature ceramic composites by preventing grain growth.

EXAMPLE 4

Economically Advantaged Materials

Some applications require expensive components. The use of composite shell-core nanoparticles may be substituted in existing material systems to yield materials with a substantial economic advantage.

Specific examples include, but are not limited to:

Materials often have weight constraints. The use of a lower density composite nanoparticle comprised of a low density core will decrease the weight of the material with respect to the same material containing the shell material, provided the core has a lower density than the shell.

Conductive materials, especially coatings are polymeric systems that contain conductive salts and/or particles. The use of a composite nanoparticle comprised of an inexpensive core and a conductive shell will yield coatings of equivalent conductivity but lower cost. Examples include silver or copper shells on aluminum oxide or silicon oxide cores.

Thermal fluids are limited with respect to usage temperature and thermal efficiency. The incorporation of a composite nanoparticle comprised of a high thermal capacity core and a thermally conductive and corrosion resistant shell into conventional thermal fluids will yield materials with higher temperature capability, greater thermal efficiency, and lower cost of ownership. Examples include zinc oxide shells (provide corrosion protection) on copper cores.

It will be apparent to those skilled in the art that various modifications and variations can be made in the shell and core materials, compositions, and methods of the invention without departing from the spirit or scope of the invention including post-treatment of shell chemistries to further enable an application. It is therefore intended that the present invention covers the modifications and variations of this invention, provided that they come within the scope of the appended claims and their equivalents.

What we claim are:

1. A composite nanoparticle material comprising a plurality of cores and a plurality of shells, with each of the shells comprising at least one metal oxide and a second metal or metal oxide, wherein at least one of the cores is encapsulated by one of the shells and at least two of the plurality of shells are capable of being sintered together to form a reticulated network.

2. The composite nanoparticle material of claim 1, wherein the cores are substantially spherical nanocrystalline particles.

3. The composite nanoparticle material of claim 1, wherein the cores each comprise at least one metal or metal oxide.

4. The composite nanoparticle material of claim 1, wherein the plurality of cores comprise more than one type of material.

5. The composite nanoparticle material of claim 1, wherein the plurality of cores have a mean diameter from about 1 nm to about 900 nm.

6. The composite nanoparticle material of claim 5, wherein the plurality of cores have a mean diameter from about 2 nm to about 100 nm.

7. The composite nanoparticle material of claim 6, wherein the plurality of cores have a mean diameter from about 5 nm to about 40 nm.

8. The composite nanoparticle material of claim 1, wherein the plurality of cores constitute from about 51 to about 100 percent, by weight, of the composite nanoparticle material.

9. The composite nanoparticle material of claim 8, wherein the plurality of cores constitute from about 75 to about 100 percent, by weight, of the composite nanoparticle material.

10. The composite nanoparticle material of claim 9, wherein the plurality of cores typically constitute from about 90 to about 100 percent, by weight, of the composite nanoparticle material.

11. The composite nanoparticle material of claim 1, wherein the shell comprises at least two layers of the composite material.

12. An oxygen storage material comprising:
a plurality of oxygen storage catalyst cores; and
a plurality of oxygen transport shells, wherein at least one of the oxygen storage catalyst cores is encapsulated by one of the oxygen transport shells.

13. The oxygen storage material of claim 12, wherein the plurality of oxygen storage catalyst cores remain separated during and after heating of the oxygen storage material to a catalytic process temperature ranging from 600° C. to 1300° C.

14. The oxygen storage material of claim 12, wherein the each of the plurality of oxygen storage catalyst cores comprises a substantially spherical nanocrystalline particle.

15. The oxygen storage material of claim 12, wherein each of the plurality of oxygen storage catalyst cores comprises at least one metal oxide selected from a group comprising lanthanides, scandium, yttrium, and lanthanum.

16. The oxygen storage material of claim 15, wherein each of the plurality of oxygen storage catalyst cores comprises a lanthanum oxide.

17. The oxygen storage material of claim 15, wherein each of the plurality of oxygen storage catalyst further comprises at least one mixed oxide of cerium.

18. The oxygen storage material of claim 15, wherein each of the plurality of oxygen storage catalyst cores further comprises a combination of oxides or mixture of oxides.

19. The oxygen storage material of claim 12, wherein each of the plurality of oxygen transport shells comprises an oxide selected from a group comprising zirconium oxide, yttrium oxide, platinum oxide, and lanthanum oxide.

20. The oxygen storage material of claim 19, wherein the oxide is zirconium oxide.

21. The oxygen storage material of claim 19, wherein each of the plurality of oxygen transport shells further comprises a metal or metal oxide selected from the group comprising platinum, yttrium oxide, platinum oxide, and lanthanum oxide.

22. The oxygen storage material of claim 21, wherein each of the plurality of oxygen transport shells comprises zirconium oxide in an amount from about 51 to about 100%, by total weight of all oxides in each shell.

23. The oxygen storage material of claim 22, wherein each of the plurality of oxygen transport shells comprises zirconium oxide in an amount from about 75 to about 100%, by total weight of all oxides in each shell.

24. The oxygen storage material of claim 23, wherein each of the plurality of oxygen transport shells comprises zirconium oxide in an amount from about 90 to about 100% by total weight of all oxides in each shell.

25. The oxygen storage material of claim 12, wherein the plurality of oxygen storage catalyst cores comprise multiple types of oxygen storage catalyst cores.

26. The oxygen storage material of claim 12, wherein the plurality of oxygen storage catalyst cores have a mean diameter from about 1 nm to approximately 900 nm.

27. The oxygen storage material of claim 26, wherein the plurality of oxygen storage catalyst cores have a mean diameter from about 2 nm to about 100 nm.

28. The oxygen storage material of claim 27, wherein the plurality of oxygen storage catalyst cores have a mean diameter from about 5 nm to about 40 nm.

29. The oxygen storage material of claim 12, wherein the plurality of cores constitute from about 51 to about 100 percent, by weight, of the oxygen storage material.

30. The oxygen storage material of claim 29, wherein the plurality of cores constitute from about 75 to about 100 percent, by weight, of the oxygen storage material.

31. The oxygen storage material of claim 30, wherein the plurality of cores constitute from about 90 to about 100 percent, by weight, of the oxygen storage material.

32. The oxygen storage material of claim 12, wherein each of the plurality of oxygen transport shells comprise a first layer of material that imparts thermal stability to the oxygen storage material and a second layer that stimulates catalytic activity in the oxygen storage material.

33. The oxygen storage material of claim 12, wherein at least two of the oxygen transport shells sinter together to form a reticulated network.

34. The oxygen storage material of claim 12, wherein each of the plurality of oxygen transport shells comprise an oxygen transport material.

35. The oxygen storage material of claim 12, wherein the oxygen storage material has a relative Oxygen Storage Capacity (OSC), at catalytic process temperatures, of about 1 with respect to unheated, uncoated, oxygen storage material at catalytic process temperatures.

36. The oxygen storage material of claim 35, wherein the catalytic process temperatures range from about 600° C. to about 1300° C.

37. The oxygen storage material of claim 36, wherein the catalytic process temperatures range from about 750° C. to about 1200° C.

38. The oxygen storage material of claim 37, wherein the catalytic process temperatures range from about 900° C. to about 1100° C.

39. A method of preparing the composite oxygen storage material of claim 12, comprising mixing a plurality of oxygen storage catalyst cores with an oxygen transport shell precursors in an environment, at a temperature, and a time effective for the shell precursor to wet the powder surface and form the shell around the oxygen storage catalyst cores.

40. The method of claim 39, further comprising heating the plurality of oxygen storage catalyst cores and the oxygen transport shell precursors a time sufficient to wet the powder, react the coating precursors, and remove process solvents or reaction byproducts.

41. The method of claim 40, further comprising heating the plurality of oxygen storage catalyst cores and the oxygen transport shell precursors a time sufficient to wet the powder, react the coating precursors, remove process solvents or reaction byproducts, and enabling at least two of the plurality of shells to sinter together to form a reticulated network.

* * * * *